No. 769,804. Patented September 13, 1904.

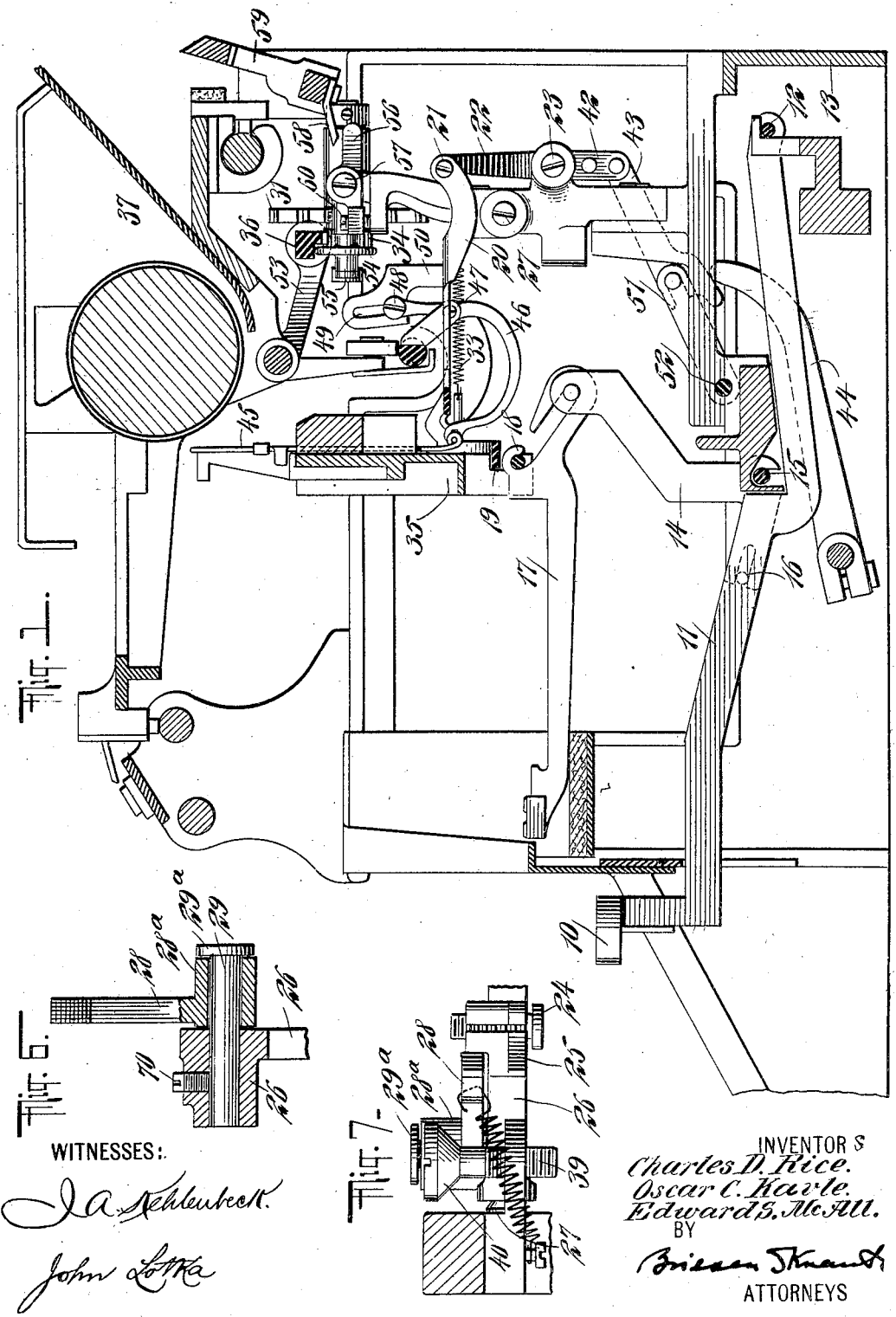

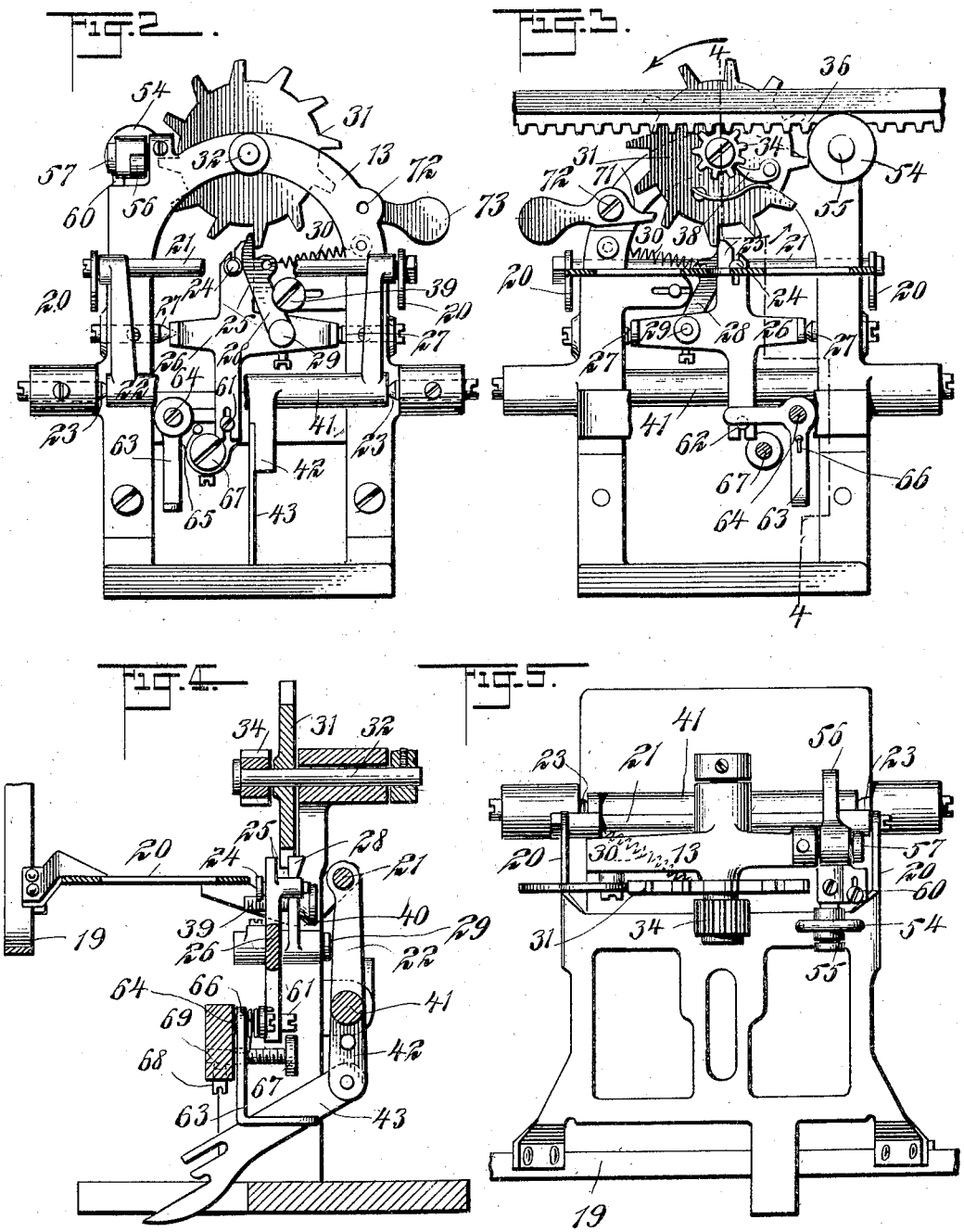

UNITED STATES PATENT OFFICE.

CHARLES DE LOS RICE, OSCAR C. KAVLE, AND EDWARD S. McALL, OF HARTFORD, CONNECTICUT, ASSIGNORS TO UNDERWOOD TYPE-WRITER COMPANY, OF NEW YORK, N. Y., A CORPORATION OF NEW JERSEY.

ESCAPEMENT MECHANISM FOR TYPE-WRITERS.

SPECIFICATION forming part of Letters Patent No. 769,804, dated September 13, 1904.

Application filed September 25, 1903. Serial No. 174,552. (No model.)

*To all whom it may concern:*

Be it known that we, CHARLES DE LOS RICE, OSCAR C. KAVLE, and EDWARD S. McALL, all citizens of the United States, and residents of Hartford, in the county of Hartford and State of Connecticut, have invented certain new and useful Improvements in Escapement Mechanisms for Type-Writers, of which the following is a specification.

Our invention relates to type-writing machines, and particularly to the escapement mechanism thereof, and has for its object to provide an easily-actuated and positively-operating escapement mechanism with proper connections to the ribbon-guide and to the tabulating mechanism.

The features and advantages of our invention will be fully described hereinafter, and the points of novelty of the structure defined in the appended claims.

Reference is to be had to the accompanying drawings, in which—

Figure 1 is a sectional elevation of a portion of a type-writing machine, taken from front to rear. Fig. 2 is a detail rear elevation of the escapement mechanism proper. Fig. 3 is a front elevation of this escapement mechanism with parts in section. Fig. 4 is a sectional elevation on line 4 4 of Fig. 3. Fig. 5 is a plan of the escapement mechanism. Fig. 6 is a detail view showing the pivot of the loose dog, and Fig. 7 is a detail plan showing the loose dog and the parts with which it coöperates.

10 indicates one of the keys, the key-lever 11 of which is fulcrumed at 12 upon the frame 13 of the machine. An elbow-lever 14, fulcrumed at 15 and having a pin-and-slot connection 16 with the key-lever 11, imparts movement to the type-bar 17, fulcrumed at 18 upon a segment 35. Each of the type-bars is adapted to engage and shift rearward a universal bar 19, which is connected by a frame 20 with a rod 21. This rod is carried by arms 22, fulcrumed at 23, preferably upon the pointed ends of screws. The frame 20 is adapted to engage an abutment 24, preferably in the nature of a screw adjustable on the fixed dog 25. The dog-carrying frame 26 is hung upon cone-centers 27, so as to be capable of a rocking motion. A loose dog 28 is pivoted on said frame at 29, and a spring 30 is attached with one end to said loose dog and with the other end to a part of the frame. The axis about which the loose dog swings extends crosswise of the axis about which the frame 26 oscillates. The spring 30 not only swings the loose dog on its pivot 29, but at the same time has a tendency to pull the dog-carrying frame 26 transversely, so as to normally engage the loose dog with an escapement-wheel 31, which is journaled at 32. The universal bar 19 and the connecting-frame 20 are normally held in a forward position by a spring 33. The escapement-wheel 31 is mounted to turn with its shaft 32, upon which is loosely mounted a pinion 34, which will normally rotate with the escapement-wheel, but will be capable of turning independently thereof under certain circumstances mentioned hereinafter. This pinion 34 is normally in engagement with a rack 36, which forms part of the carriage 37, and is further engaged by a spring-pressed pawl 38, carried by the escapement-wheel 31. Thus the escapement-wheel and the pinion will always rotate together in one direction, which is the direction of the ordinary feed; but when the carriage is returned to its position at the beginning of a line the pinion may turn independently of the escapement-wheel. To arrest a return movement of the escapement-wheel 31, we provide a pawl 71, fulcrumed on the machine-frame at 72 and arranged to swing aside when the escapement-wheel turns forward, but to stop its backward movement. For this purpose the pawl is returned to its operative position in any suitable manner, as by making the outer portion or handle 73 heavier than the inner portion or pawl proper.

Normally, as hereinbefore stated, the loose dog 28 is in engagement with the escapement-wheel. It will be understood that the propelling-spring of the carriage tends to rotate the escapement-wheel in the direction indicated by the arrow in Fig. 3. When the universal bar 19 is moved by the action of any of the type-bars, the frame 20 strikes the abutment 24 and swings the dog-frame 26 on its pivots 27. Thus the fixed dog 25 is first brought in mesh with the escapement-wheel and then the loose dog 28 is disengaged from the escapement-wheel. As soon as the loose dog is free it is swung on its pivot 29 by the spring 30. This movement brings the loose dog in engagement with a deflecting-abutment, which may be in the nature of a screw 39, having a beveled surface 40. The bevel of this screw is so arranged that it will deflect the loose dog 28 and the frame 26, which carries said dog, in a forward direction, so as to again bring the loose dog 28 into the path of the escapement-wheel and to disengage the fixed dog therefrom. Of course the loose dog now comes into engagement with a different tooth of the escapement-wheel, and as soon as the fixed dog swings clear of the escapement-wheel the latter turns, carrying the loose dog with it, until the latter reaches the normal position, (shown in Fig. 2,) where it abuts against the screw or equivalent device 24. We prefer to arrange the spring 30 in an oblique position, as shown best in Figs. 5 and 7, so that the spring will not only throw the loose dog 28 on its pivot 29, but will also assist in rocking the dog-carrying frame 26 on its pivots 27. In fact, with this arrangement of the spring 30 the beveled surface 40 may be dispensed with and the screw 39 used simply as an abutment. For the sake of a perfectly-positive movement the beveled surface 40 may be retained.

In order that the escapement may be operated from the space-bar as well as from any one of the type-bars, we have provided the shaft 41, which connects the arms 22, with a downward extension 42, to which is rigidly secured an arm 43, worked by an extension 44 of the space-bar.

The ribbon-guide 45 is vertically movable and is connected with a lever 46, fulcrumed at 47 and having at its upper end a pin 48, which projects into a slot 49 of a bracket 50, secured to the connecting-frame 20.

The ribbon-feed mechanism, which may consist of the usual pawls and has not been shown, may be worked by a lever 51, having a pin-and-slot connection with the arm 43 and secured to the rock-shaft 52, which carries the pawls for feeding the ribbon.

The rack 36, which engages the pinion 34, is carried by arms 53, pivotally secured to the carriage, and is suitably supported. One of the supports for this rack consists of a wheel or roller 54, which is arranged adjacent to the pinion 34 and engages a smooth surface or runway provided on the rack-bar adjacent to the rack-teeth, as shown in Figs. 1 and 3. This roller is mounted to turn on a pin 55, which is secured to a carrier 56, fulcrumed on the frame at 57, so as to swing about an axis extending lengthwise of the rack. The carrier 56 is adapted to be engaged by a projection 58, connected with the tabulating-stop 59. By this arrangement the rack is supported and guided adjacent to its engagement with the pinion 34, and thus even if the rack should not be quite parallel with the carriage it would be kept in the proper relation to the pinion and a satisfactory operation would still be obtained. The carrier 56 is provided with an adjustable screw 60, arranged to engage a portion of the frame and permitting of adjusting the roller 54, and with it the rack 36, up or down. It will be understood that when the tabulating-stop is operated by any suitable mechanism the roller 54 is lifted, causing the rack to be raised out of engagement with the pinion, and thus releasing the carriage.

The dog-carrier 26 is limited in its movement by the engagement of an adjustable stop-screw 61 with an abutment 62. This abutment is carried by a lever 63, fulcrumed at 64, and by swinging this lever the abutment may be carried out of the path of the stop-screw 61. This is done for the purpose of allowing certain parts to be removed from the machine—for instance, in machines where the type-bars are released for removal by manually giving the universal bar a rearward movement greater than its normal movement. A pin 65 limits the movement of the lever 63 and determines its normal position. A spring 66 keeps the abutment in its normal position. The return movement of the dog-frame 26 under the influence of the spring 30 is limited by an adjustable screw 67, arranged at the lower end of the said frame. The displacement of the adjustable screw 67 is prevented by means of a set-screw 68, provided with a copper pad 69 at its end.

At several places we employ a pivot construction, which is used instead of shouldered screws and has the advantage of being capable of longitudinal adjustment until a perfect fit is secured and the further advantage of less liability to break. Fig. 6 shows this new construction of the pivot as applied to the pivot of the loose dog 28. The pivot-pin 29 has a head 29$^a$, which abuts against the hub 28$^a$ of the loose dog, and said pin extends into a suitable aperture of the frame 26, and after the head 29$^a$ has been properly adjusted the pivot-pin is secured by a set-screw 70. This pivot construction we also use for the pivot 57, and it may be employed at other points of the machine also.

What we claim as new, and desire to secure by Letters Patent, is—

1. In an escapement, a rotary escapement-wheel, a dog-carrier mounted to rock about an axis transverse to that of the escapement-wheel, dogs mounted on said carrier and arranged to engage said escapement-wheel, and a universal bar arranged to move in a direction substantially parallel with the shaft of the escapement-wheel and to engage the dog-carrier adjacent to the dogs and on the same side of the carrier's fulcrum on which the dogs are located.

2. In an escapement, a movable dog-carrier, escapement mechanism operated by said carrier, means for moving the carrier, and a stop movable into and out of operative relation to the carrier to normally limit the movement of the carrier, and to allow an abnormal movement of the carrier when desired.

3. In an escapement, a movable dog-carrier, escapement mechanism operated by said carrier, means for moving the carrier, and a stop movable into and out of operative relation to the carrier to normally limit the movement of the carrier and to allow an abnormal movement of the carrier when desired, and a spring connected with said stop.

4. In an escapement, a movable dog-carrier, escapement mechanism operated by said carrier, means for moving the carrier, a frame, and a stop-lever fulcrumed upon the frame and movable into and out of the path of the dog-carrier.

5. In an escapement, a movable dog-carrier, escapement mechanism operated by said carrier, means for moving the carrier, a frame, and a stop-lever fulcrumed upon said frame, and movable into and out of the path of an adjustable stop mounted on the dog-carrier.

6. In an escapement, a movable dog-carrier, an escapement mechanism operated by said carrier, means for moving the carrier, a frame and an adjustable screw mounted on said frame and adapted to act as a stop to limit the movement of the carrier, and a pad arranged to be engaged by a set-screw for securing the stop-screw against displacement.

7. In a type-writing machine having a traveling carriage, a rack mounted on said carriage, an escapement, a pinion connected with said escapement and adapted to be engaged by the rack, said rack being provided with a smooth surface or runway, and means for disengaging the rack from the pinion, comprising an arm fulcrumed on the frame, a roller mounted on said arm, and adapted to engage the runway of the rack, and a rearwardly-extending member of said roller-arm, means for engaging said member to disengage the rack from the pinion, and an adjustable screw for adjusting the movement of the roller-arm.

In testimony whereof we have signed our names to this specification in the presence of two subscribing witnesses.

CHARLES DE LOS RICE.
   OSCAR C. KAVLE.
   EDWARD S. McALL.

Witnesses:
 CHAS. B. COOK,
 EDWARD B. STORY.